J. B. ADDUCI.
ANTISKIDDING ATTACHMENT.
APPLICATION FILED APR. 28, 1919.
1,325,389.
Patented Dec. 16, 1919.
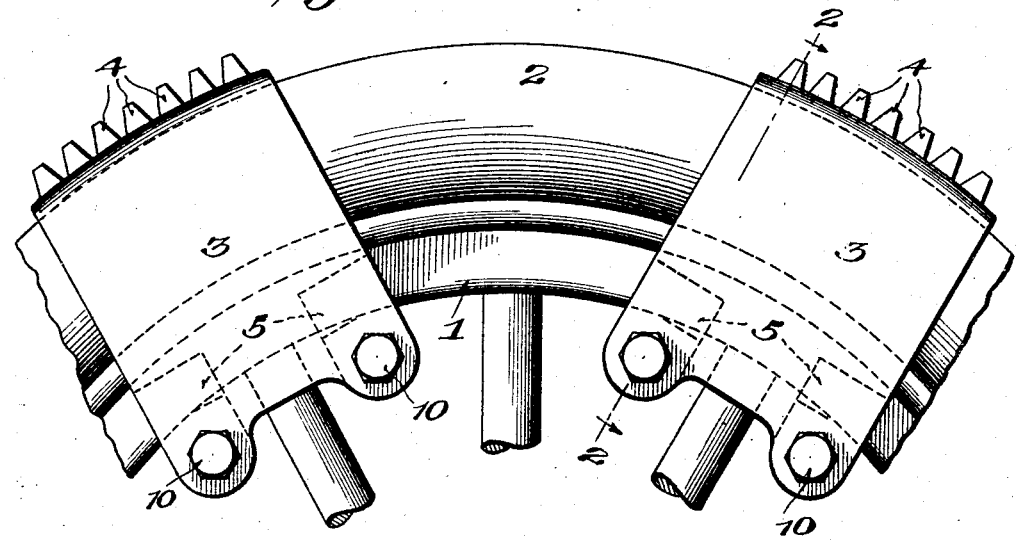
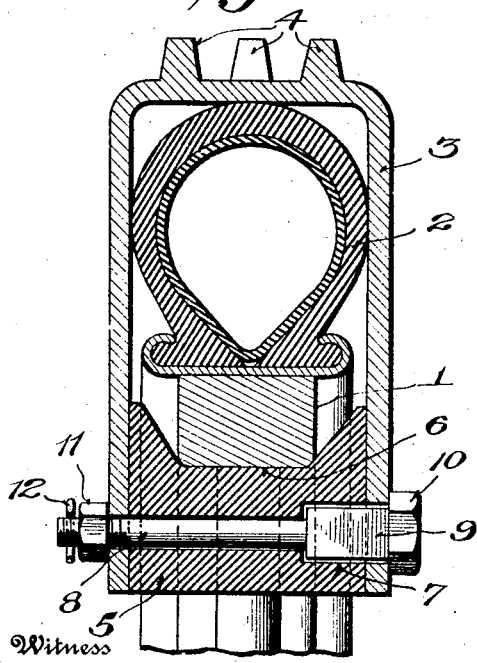
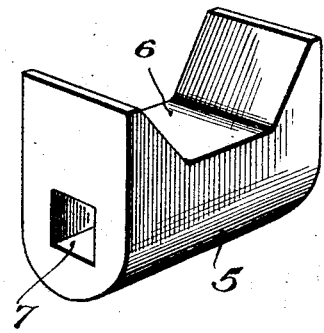
Inventor
John B. Adduci,

UNITED STATES PATENT OFFICE.

JOHN B. ADDUCI, OF BOSTON, MASSACHUSETTS.

ANTISKIDDING ATTACHMENT.

1,325,389.         Specification of Letters Patent.       Patented Dec. 16, 1919.

Application filed April 28, 1919. Serial No. 293,219.

*To all whom it may concern:*

Be it known that I, JOHN B. ADDUCI, a citizen of the United States, residing at Boston, in the county of Suffolk and State of Massachusetts, have invented certain new and useful Improvements in Antiskidding Attachments, of which the following is a specification.

This invention relates to a device that can be quickly attached to the tire and rim of an automobile, either of the pneumatic or cushion type, and which will prevent skidding, increase the tractional grip on the road surface, and at the same time will not mar the rim by rubbing or binding against it. It also requires no cutting or boring of a rim or felly to place in position.

From three to six of these attachments may be employed on a wheel.

The invention consists in the novel features of construction hereinafter described, pointed out in the claims and shown in the accompanying drawings, in which:—

Figure 1 is a side elevation of a portion of a wheel showing two of my devices in place.

Fig. 2 is a section on the line 2—2 of Fig. 1.

Fig. 3 is a detail perspective view of a rubber block.

In practice it is not necessary to place the devices as close together as shown in the drawing, and in most cases four to six to the wheel would be all that would be required, or three might be advantageously used on the wheels. In order to clearly show the device I have slightly enlarged some parts with respect to the size of the tire.

In these drawings 1 designates the wheel felly and 2 the tire. A U-shaped metal plate 3 is placed over the tire, gripping the same firmly when inflated, and this clip extends inwardly beyond the rim and felly, and preferably out of contact with them.

Placed within the inner end portion of the clip and transversely with respect to it, are two rubber blocks 5. These blocks are cut out or recessed as at 6 to engage the inner face of the felly. They serve as spacers for the side members of the clips, and as securing devices for holding the clips in place.

These rubber blocks are held in place by bolts 8. A suitable bore is of course formed in each block and one end of this bore is enlarged and squared as at 7. This receives the squared portion 9 of the bolt which is also provided with a head 10 and is kept in place by a nut 11, locked in position by a cotter pin 12.

The squared portion 9 is slightly smaller than the opening 7 of the block, so that while the block cannot turn over it has a slight rocking movement on the bolt. In placing the clips in position they are so placed that a wheel spoke extends between the two blocks. The slight rocking movement of the blocks allows giving under strains and slight play of the clips on the wheel, limited as to creeping by the spoke extending between the blocks.

The rubber prevents any marring of the finish on the felly.

To prevent skidding the exterior bow portion of the clips 3 are roughened in any suitable way, as by forming projections 4 on them.

These may be produced in any way, have any desired form or arrangement, and be in any number. They should not be deep or sharp enough to injure the road surface, and at the same time should give a sufficient grip to prevent side slipping of the wheel. They can be formed in various ways and sizes depending on the weight of the car with which they are to be used, and the kind of work required of it, for a heavy truck or tractor they would be larger and heavier than for a small runabout used only for pleasure purposes and driven more or less on park roads from which the commercial truck is excluded.

What I claim is:—

1. In a device of the kind described, metal U-shaped clips having a roughened exterior bow portion, said clip when in position engaging the sides of a tire and extending inwardly beyond a wheel rim and felly, rubber blocks secured in the inner end of the clip and adapted to engage the inner face of the felly, and means for holding said blocks in place, said means permitting slight rocking movement of the blocks.

2. In a device of the kind described, a U-shaped metal clip having projections formed on its bow portion, said clip being adapted to embrace a tire, rim and felly, and engaging the tire on the tread portion and at the sides, rubber spacing blocks secured transversely in the open end of the clip and spacing the side members of the clip from the rim and felly, said blocks having a bore and a squared opening at one end, and bolts having squared portions, the bolts passing though the clip and through the bores of the blocks, the squared portions of the bolts resting loosely in those of the blocks.

In testimony whereof I have affixed my signature.

JOHN B. ADDUCI.